United States Patent
Thomas et al.

(10) Patent No.: US 10,012,330 B1
(45) Date of Patent: Jul. 3, 2018

(54) ORBITAL CABLE HOLDER SYSTEMS AND METHODS

(71) Applicant: The Boeing Company, Chicago, IL (US)

(72) Inventors: Daniel S. Thomas, Summerville, SC (US); Jeffrey R. Dempsey, Lynnwood, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/453,520

(22) Filed: Mar. 8, 2017

(51) Int. Cl.
| F16L 3/16 | (2006.01) |
| B64C 1/00 | (2006.01) |
| B64C 3/00 | (2006.01) |
| F16L 3/10 | (2006.01) |
| F16L 3/22 | (2006.01) |
| F16C 11/06 | (2006.01) |
| H02G 3/04 | (2006.01) |
| B60R 16/02 | (2006.01) |

(52) U.S. Cl.
CPC ............ *F16L 3/16* (2013.01); *B60R 16/0222* (2013.01); *B64C 1/00* (2013.01); *B64C 3/00* (2013.01); *F16C 11/0604* (2013.01); *F16C 11/0614* (2013.01); *F16L 3/1075* (2013.01); *F16L 3/221* (2013.01); *H02G 3/0456* (2013.01)

(58) Field of Classification Search
CPC . F16L 3/16; F16L 3/1075; F16L 3/221; B60R 16/0222; B64C 1/00; B64C 3/00; F16C 11/0604; F16C 11/0614; H02G 3/0456

USPC ........................................................ 174/70 R
See application file for complete search history.

(56) References Cited

U.S. PATENT DOCUMENTS

| 1,672,605 | A | 6/1928 | Dobrick |
| 5,109,321 | A | 4/1992 | Maglica et al. |
| 6,627,817 | B1 | 9/2003 | Kortenbach |
| 6,830,225 | B2 | 12/2004 | Kato |
| 7,534,965 | B1 * | 5/2009 | Thompson ............... H02G 3/22 16/2.1 |
| 8,733,709 | B2 * | 5/2014 | Meyers ............... B60R 16/0215 248/65 |
| 2006/0024994 | A1 * | 2/2006 | Kato ..................... F16L 3/1025 439/92 |
| 2010/0025272 | A1 * | 2/2010 | Stau ........................ F16L 3/237 206/349 |

* cited by examiner

*Primary Examiner* — Timothy Thompson
*Assistant Examiner* — Michael F McAllister
(74) *Attorney, Agent, or Firm* — Haynes and Boone, LLP (57) ABSTRACT

Systems and methods are provided for cable routing, such as within vehicles or structures. In certain examples, a cable holder is disclosed that includes one or more loop members with an interior groove and a rotatable cable holding member disposed within the interior groove. The rotatable cable holding member can be configured to rotate to decrease bends and/or stresses within the cable that the rotatable cable holding member is holding. Additionally, the rotatable cable holding member can be configured so that the cable held is perpendicular to the support for the cable.

20 Claims, 6 Drawing Sheets

ORBITAL CABLE HOLDER SYSTEMS AND METHODS

TECHNICAL FIELD

The disclosure relates generally to cable harnesses used in aircraft, and more specifically to securing cable harnesses within aircraft.

BACKGROUND

Modern aircraft include cable harnesses that are secured to the aircraft. For example, such harnesses include one or more wires and/or cables that are required to be secured in a manner that minimizes the possibility of failure of the wires and/or cables. Being secured in such a manner can be difficult when the wires and/or cables are stiff or routed in a manner that does not match the physical properties of the wires and/or harnesses.

SUMMARY

Systems and methods are disclosed herein for an orbital cable holder. In certain examples, an aircraft is disclosed that includes a cable disposed within the aircraft, and a cable holder configured to secure the cable to the aircraft. The cable holder includes a loop member including an interior groove and configured to couple to the aircraft, and a rotatable cable holding member disposed within the interior groove, configured to rotate within the interior groove, and including an opening configured to receive the cable and allow the cable to pass through.

In certain other examples, a cable holder configured to secure a cable to a structure is disclosed. The cable holder includes a loop member including an interior groove and configured to couple to the structure, and a rotatable cable holding member disposed within the interior groove, configured to rotate within the interior groove, and including an opening configured to receive a cable and allow the cable to pass through.

In certain additional examples, a method for securing a cable to a structure is disclosed. The method can include inserting a cable through an opening of a rotatable cable holding member disposed within the interior groove of a loop member, orienting the rotatable cable holding member by rotating the rotatable cable holding member relative to the loop member, and coupling the loop member to a structure.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Systems and techniques are disclosed for routing and securing cable harnesses, such as for example within aircraft. The cable harnesses include one or more wires and/or cables that include conductive elements, shielding, and/or insulation. The cable harnesses are mounted on a vehicle such as an aircraft, and can be routed internally within the vehicle. For example, the cable harnesses can be routed within internal areas of one or more of a fuselage, airfoil, engine, tail, and/or other portion of the aircraft.

The systems and techniques described herein allow for improved cable harness routing and securing within a vehicle. The systems and techniques described herein include a cable holder that includes a rotatable cable holding member. A wire and/or cable can be inserted into an opening of the rotatable cable holding member and the rotatable cable holding member can be oriented to minimize stress on the wire and/or cable. The angle that the rotatable cable holding member is oriented to can then be locked into place. The cable holder can also be coupled to the vehicle.

The apparatuses, systems, and techniques described herein can be used for securing wires (e.g., a single conductor surrounded by insulation) and/or cables (e.g., multiple conductors surrounded by insulation) to a vehicle. Such wires and/or cables can include insulation and/or shielding. It is appreciated that this disclosure refers to "cables" generically. As such, for the purposes of this disclosure, "cable" or "cables" may refer to any conductor, including conductors with insulation and/or shielding, such as a single conductor with insulation and/or shielding (e.g., a wire) or multiple conductors with insulation and/or shielding (e.g., a cable), respectively. Additionally, "cables" may also refer to a harness that includes multiple wires and/or cables.

Figure 1:
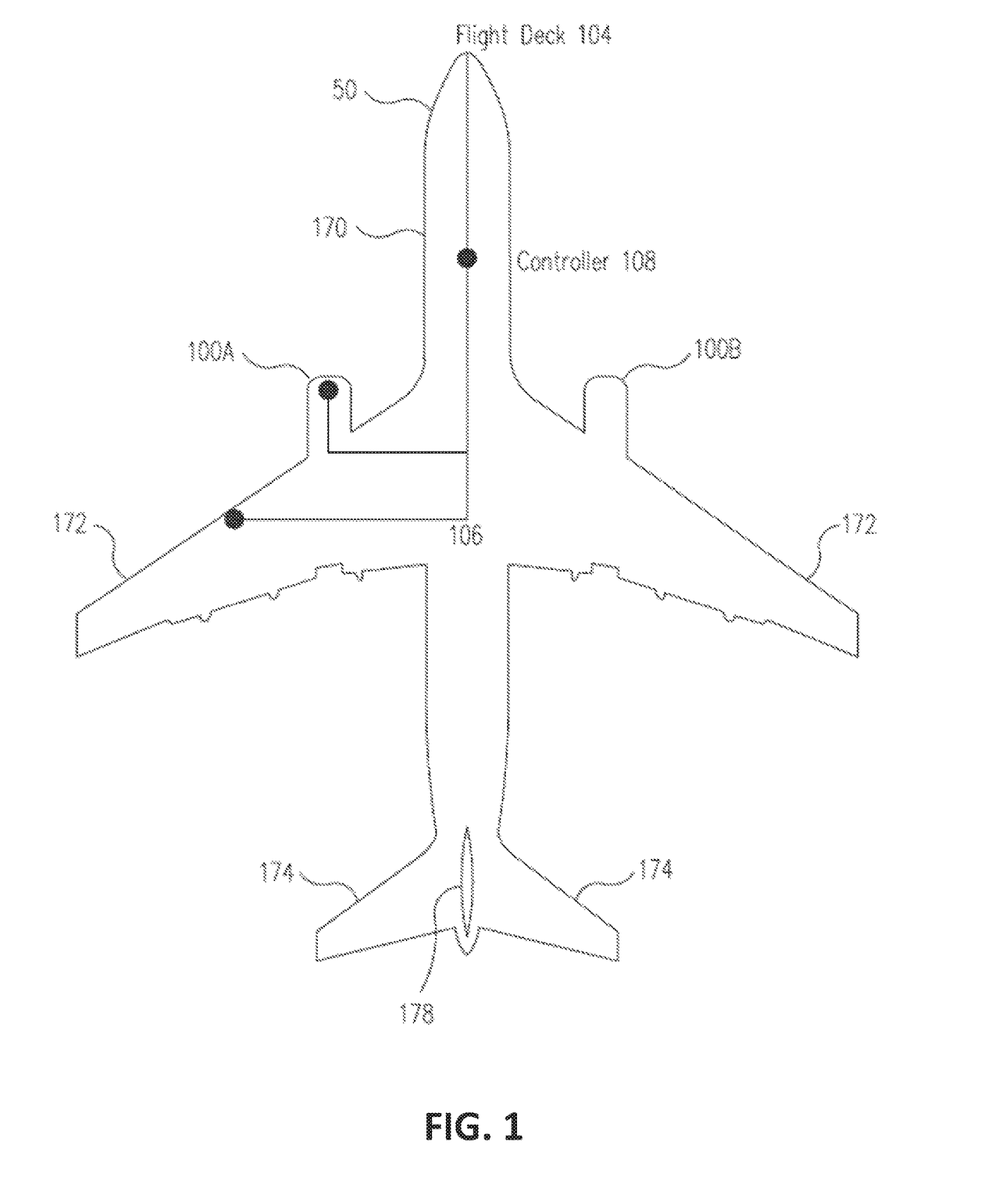
FIG. 1 illustrates an aircraft in accordance with an example of the disclosure.

FIG. 1 illustrates an aircraft in accordance with an example of the disclosure. FIG. 1 illustrates a top view of an aircraft in accordance with an embodiment of the disclosure. The aircraft 50 of FIG. 1 includes a fuselage 170, wings 172, horizontal stabilizers 174, aircraft propulsors 100A and 100B, and a vertical stabilizer 178. Various controls and sensors are present on the aircraft 50. For example, the aircraft 50 includes a flight deck 104 where a pilot may input instructions for operation of the aircraft 50. The flight deck 104 of the aircraft 50 can include controls that can be manipulated by the pilot(s) of the aircraft 50 to provide instructions for the operation of the aircraft. For example, the flight deck 104 can include a control or controls configured to control operation of the aircraft propulsors 100A and 100B. The flight deck 104 can also include controls for determining a configuration of the horizontal stabilizer or other aerodynamic device of the aircraft 50 as well as the configuration of the vertical stabilizer.

The inputs can be communicated to the controller 108, which can then provide outputs to various systems of the aircraft 50 (e.g., aircraft propulsors 100A and 100B). The various systems of the aircraft 50 can input/output electronic signals and/or be powered electrically by electrical system 106. Electrical system 106 includes one or more wires, cables, and/or wire and/or cable harnesses. Such wires, cables, and/or wire and/or cable harnesses can communicate electrical signals (e.g., inputs, outputs, and/or controller instructors), provide electrical power, and/or provide other electric outputs.

The controller 108 can include, for example, a single-core or multi-core processor or microprocessor, a microcontroller, a logic device, a signal processing device, memory for storing executable instructions (e.g., software, firmware, or other instructions), and/or any elements to perform any of the various operations described herein. In various examples, the controller 108 and/or its associated operations can be implemented as a single device or multiple devices (e.g., communicatively linked through wired or wireless connections) to collectively constitute the controller 108.

The controller 108 can include one or more memory components or devices to store data and information. The memory can include volatile and non-volatile memory. Examples of such memories include RAM (Random Access Memory), ROM (Read-Only Memory), EEPROM (Electrically-Erasable Read-Only Memory), flash memory, or other types of memory. In certain examples, the controller 108 can be adapted to execute instructions stored within the memory to perform various methods and processes described herein, including implementation and execution of control algorithms responsive to sensor and/or operator (e.g., flight crew) inputs.

The aircraft 50 described in FIG. 1 is exemplary and it is appreciated that in other embodiments, the aircraft 50 may include less or additional components (e.g., no horizontal stabilizer, additional stabilizers, additional sensors, and/or additional controllers). Additionally, concepts described herein may be extended to other vehicles such as helicopters, Unmanned Aerial Vehicles, automobiles, ships, etc.

Figure 2:
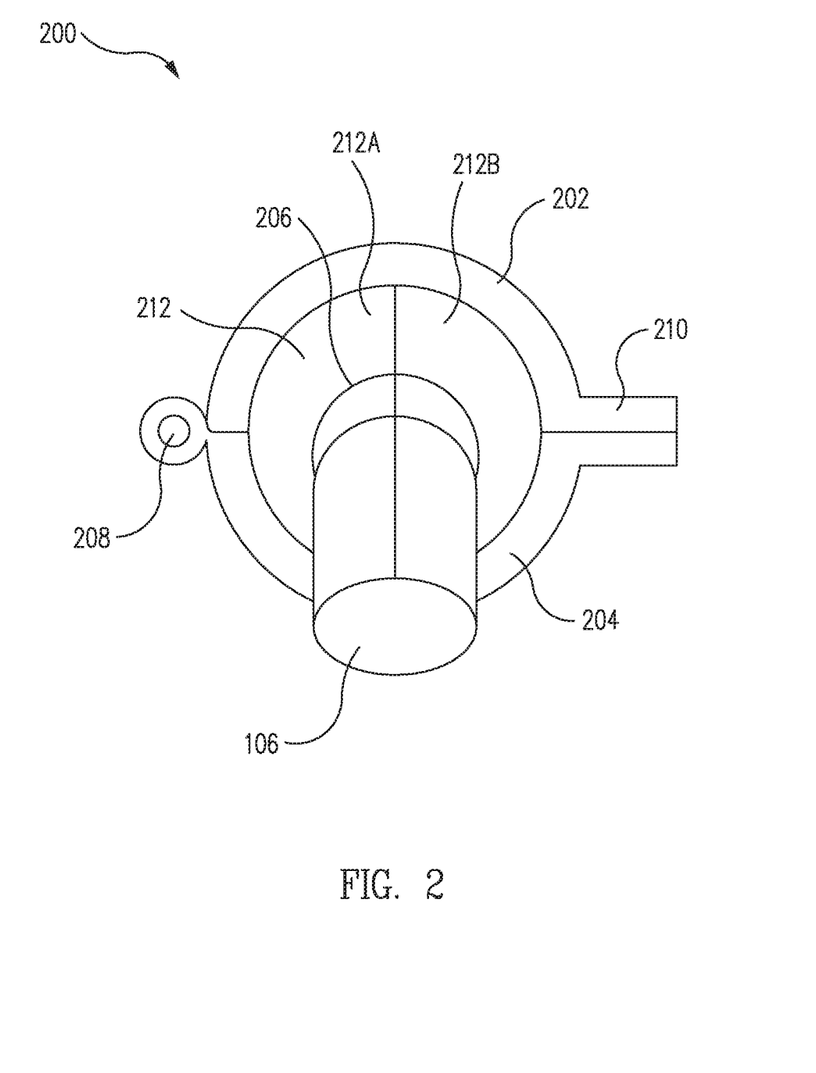
FIG. 2 illustrates a view of an orbital cable holder in accordance with an example of the disclosure.

FIG. 2 illustrates a view of an orbital cable holder in accordance with an example of the disclosure. FIG. 2 illustrates an orbital cable holder 200 that includes a first loop member arm 202, a second loop member arm 202, and a rotatable cable holding member 212.

The first loop member arm 202 and the second loop member arm 204 are coupled together via a hinge coupling 208 on a first side and a clamp coupling 210 on a second side. In FIG. 2, the second side is opposite that of the first side, but other examples can dispose the first and second sides in other positions. The hinge coupling 208 can be a hinge that allows the first loop member arm 202 and the second loop member arm 204 to rotate relative to each other.

The clamp coupling 210 is a coupling that is configured to couple together the first loop member arm 202 and the second loop member arm 204. When coupled together by the clamp coupling 210, the first loop member arm 202 and the second loop member arm 204 are prevented to rotating relative to one another. The clamp coupling 210 can be, for example, a nut and/or bolt style coupling that clamps together the first loop member arm 202 and the second loop member arm 204, a magnetic coupling, a mechanism located on one or both of the first loop member arm 202 and the second loop member arm 204 that includes locked and unlocked positions, and/or another such coupling.

In certain examples, the clamp coupling 210 can also be configured to secure the orbital cable holder 200 to a vehicle (e.g., an aircraft). As such, the orbital cable holder 200 can be coupled (e.g., bolted to) the vehicle via the clamp coupling 210. For example, a bolt or threaded insert can be inserted into and/or received by an opening of the clamp coupling 210. A nut can then be attached to the threads to secure the orbital cable holder to the vehicle. In certain examples, a spacer can be coupled to the bolt and/or insert to provide proper clearance for the orbital cable holder 200 from a portion of the vehicle. Certain other examples of the clamp coupling 210 can include the bolt, threaded insert, nut, and/or other coupling component.

The first loop member arm 202 and the second loop member arm 204 can, separately or collectively, include and/or define an interior groove. For example, the interior groove can be a cavity within the first loop member arm 202 and/or the second loop member arm 204. The interior groove can be partially spherical and configured to receive the rotatable cable holding member 212 and allow rotation of the rotatable cable holding member 212 when the rotatable cable holding member 212 is disposed within the interior groove.

The rotatable cable holding member 212 can be a spherical or partially spherical member that can be configured to rotate within the interior groove. In certain examples, the rotatable cable holding member 212 can be rotated in multiple different directions (e.g., in multiple degrees of freedom). Also, certain examples can allow the rotatable cable holding member 212 to only be able to rotate when the first loop member arm 202 and the second loop member arm 204 are unlocked. When the first loop member arm 202 and the second loop member arm 204 are locked, the rotatable cable holding member 212 is clamped within the interior groove and prevented from rotating.

The rotatable cable holding member 212 includes an opening 206 configured to hold and allow one or more cables (e.g., cable 106) to pass through. The opening 206 can hold the cable to rotate the cable along with rotation of the rotatable cable holding member 212. The opening 206 can be shaped to substantially conform to an outer circumference of the cross section of the cable 106. As such, the opening 206 can be configured so that the cable 106 is snuggly held within the opening 206.

In certain examples, the rotatable cable holding member 212 can include a plurality of rotatable cable holding member pieces. For example, the rotatable cable holding member 212 of FIG. 2 includes the rotatable cable holding member pieces 212A and 212B. Other examples can include other numbers of rotatable cable holding member pieces, such as a three piece, four piece, or five or more piece rotatable cable holding member. Such rotatable cabling holding members are configured, when coupled together, to rotate within the interior groove. In certain such examples, the rotatable cable holding member pieces 212A and 212B are coupled together and collectively define the opening 206 (e.g., the opening 206 is defined by features on both the holding member piece 212A and the hold member piece 212B). The rotatable cable holding member pieces 212A and 212B can be configured to be assembled around the cable 106 before being assembled into a complete rotatable cable holding member 212 and positioned within the opening 206. Certain other examples can include one or more openings that are defined by just one of the plurality of rotatable cable holding member pieces.

In certain examples, each end of the opening 206 defines a support plane (e.g., the support plane is defined by, for example, having each point of the circular cross section of the end of the opening on the support plane) and the opening 206 is configured to hold the cable 106 so that the distal axis of the cable 106 (e.g., the axis defining the length of the cable 106) is substantially perpendicular to the plane.

Such a configuration of holding the cable 106 is desirable in certain examples. For example, certain applications can include design standards directed to how cables are supported. Such standards can include a maximum deviation, from perpendicular, that the cable can be relative to any support of the cable. Conventional cable support techniques can have difficulties meeting such standards as such conventional supports are not movable. In certain applications, the cable may include curves and/or bends along its length. As the curves and/or bends may, fully or partially, be in free space, the cable supported by conventional supports can fail to meet such design standards. The rotatable cable holding member 212 of the orbital cable holder 200 allows the cable 106 to always be held perpendicular to the support even if the cable 106 has curves within its length, thus meeting such design standards.

In certain examples, a deformable layer is disposed between the first loop member arm 202 and/or the second loop member arm 204 and the rotatable cable holding member 212. The deformable layer can be a gasket that, when the first loop member arm 202 and the second loop member arm 204 are clamped together, can aid in preventing the rotatable cable holding member 212 from rotating. Additionally, the deformable layer can be deformed even when the first loop member arm 202 and the second loop member arm 204 are not fully locked together to prevent the rotatable cable holding member 212 from inadvertently being moved away from a set position (e.g., while the position of the cable is being set.

Figure 3:
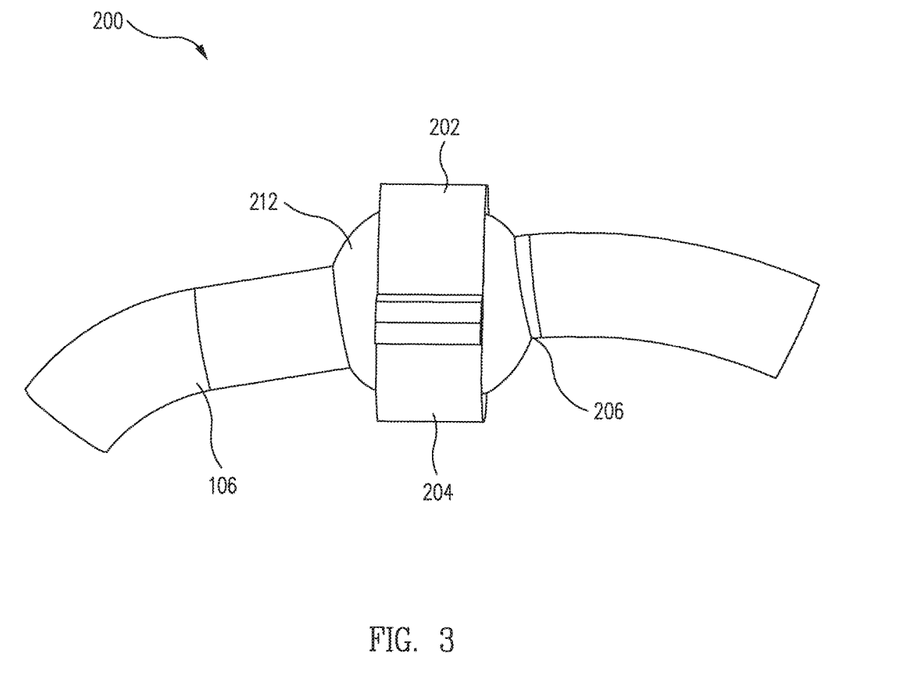
FIG. 3 illustrates another view of an orbital cable holder in accordance with an example of the disclosure.

FIG. 3 illustrates another view of an orbital cable holder in accordance with an example of the disclosure. FIG. 3 illustrates the orbital cable holder 200 of FIG. 2 from a side view. As shown in FIG. 3, the rotatable cable holding member 212 is rotated within the interior groove defined by the first loop member arm 202 and the second loop member arm 204. The rotatable cable holding member 212 can be rotated responsive to, for example, an input from a technician moving the rotatable cable holding member 212 and/or from a first portion of the cable 106 on a first side of the orbital cable holder 200 (e.g., the right hand side of the figure) being disposed higher than a second portion of the cable 106 on a second side of the orbital cable holder 200 (e.g., the left hand side of the figure). In certain examples, forces from the cable 106 can automatically rotate the rotatable cable holding member 212 to minimize stresses within the cable 106 and/or to maximize the bend radius of bends within the cable 106. As such, in order to minimize stress on the cable 106 and/or continue to meet cable routing requirements, the rotatable cable holding member 212 is rotated while holding the cable 106.

Figure 4:
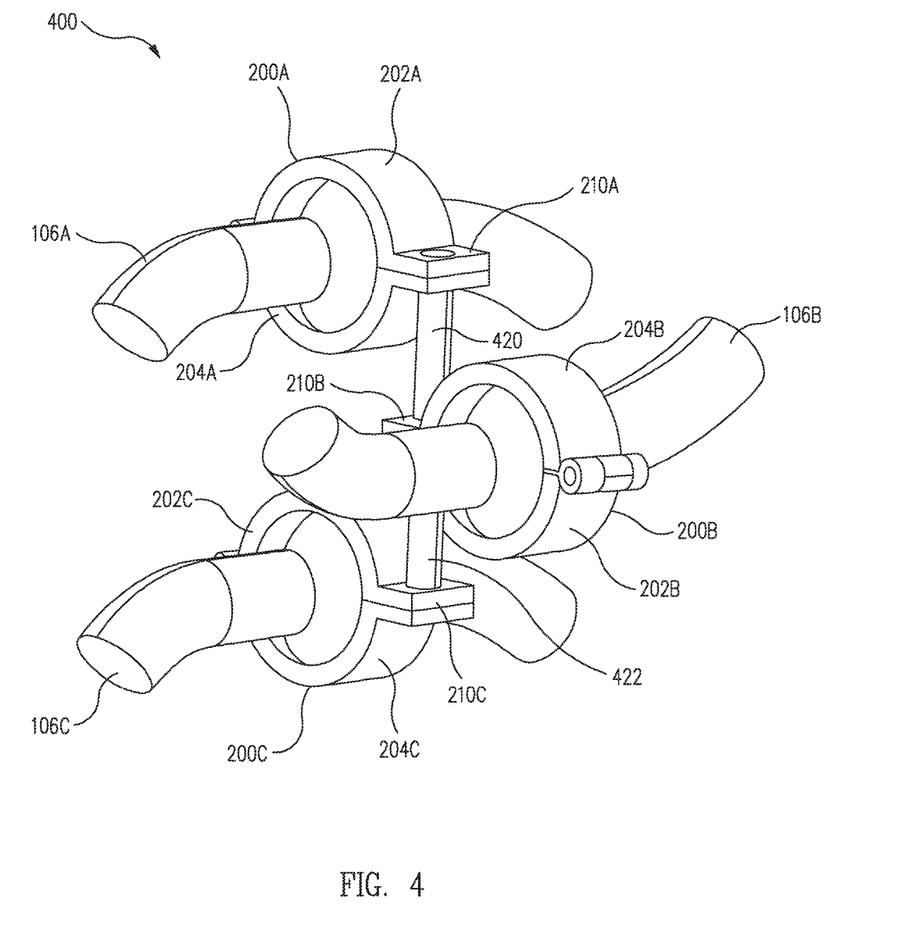
FIG. 4 illustrates a view of a multiple orbital cable holder system in accordance with an example of the disclosure.

FIG. 4 illustrates a view of a multiple orbital cable holder system in accordance with an example of the disclosure. In certain examples, each of a plurality of cables is required to be separated from other cables by a minimum distance. Such a minimum distance can, for example, decrease and/or eliminate electromagnetic interference from other cables, minimize entanglement of various cables, and/or allow for easier cable routing.

In FIG. 4, a multiple orbital cable holder system 400 includes orbital cable holders 200A-C. Each of the orbital cable holders 200A-C includes first loop member arms 202A-C, second loop member arms 204A-C, and rotatable cable holding members 212A-C, respectively. Each of the rotatable cable holding members 212A-C are, as shown in FIG. 4, respectively holding one of the cables 106A-C.

Orbital cable holders 200A and 200B are separated by spacer 420. Orbital cable holders 200B and 200C are separated by spacer 422. In the example shown in FIG. 4, the spacers can be coupled to the orbital cable holders via the clamp coupling 210A-C. For example, the spacers can couple two of the orbital cable holders together or the orbital cable holders can be coupled together via a bolt and the spacers can be sleeves disposed over and/or around the bolt that are configured to bottom against a surface of the clamp couplings to hold two orbital cable holders at a pre-determined distance (e.g., a distance equal or greater to that of the minimum distance).

Figure 5:
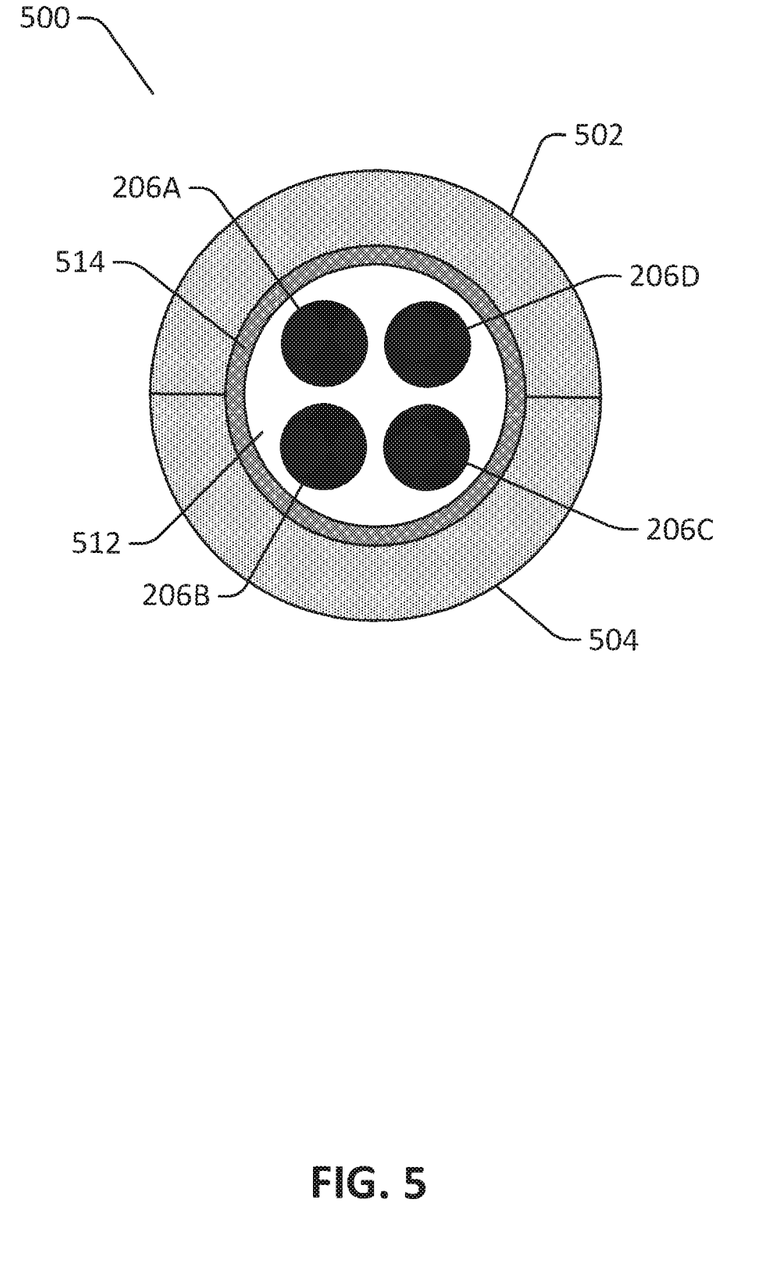
FIG. 5 illustrates a cutaway view of an orbital cable holder in accordance with an example of the disclosure.

FIG. 5 illustrates a cutaway view of an orbital cable holder in accordance with an example of the disclosure. FIG. 5 illustrates a cutaway of orbital cable holder 500. Orbital cable holder 500 is a multi-cable orbital cable holder. As such, orbital cable holder 500 includes a first loop member arm 502, a second loop member arm 504, a deformable layer 514, and a rotatable cable holding member 512.

The first loop member arm 502 and the second loop member arm 504 are similar to the first loop member arm 202 and the second loop member arm 204, respectively, of FIGS. 2-4. Thus, the first loop member arm 502 and/or the second loop member arm 504 define, separately and/or collectively, an interior groove that the rotatable cable holding member 512 is disposed within.

As shown in FIG. 5, a deformable layer 514 is disposed between the rotatable cable holding member 512 and the first loop member arm 202 as well as the second loop member arm 204. The deformable layer 514 can hold the rotatable cable holding member 512 in a set position even when the first loop member arm 202 and the second loop member arm 204 are not clamped together. The deformable layer 514 can be, for example, a component made of rubber, compressible plastic, gasket material, and/or another such deformable material.

The rotatable cable holding member 512 includes a plurality of openings 506A-D. Each of the openings 506A-D is configured to hold and allow one or more cables to pass through. Each of the openings 506A-D rotates along with rotation of the rotatable cable holding member 512. Each of the openings 506A-D can be shaped to substantially conform to an outer circumference of the cross section of a cable that it is configured to receive and hold. In certain examples, each of the openings 506A-D is configured to hold a cable so that the distal axis of the cable (e.g., the axis defining the length of the cable 106) is substantially perpendicular to a plane defined by, for example, the circular cross section of an end of one of the openings 506A-D.

Figure 6:
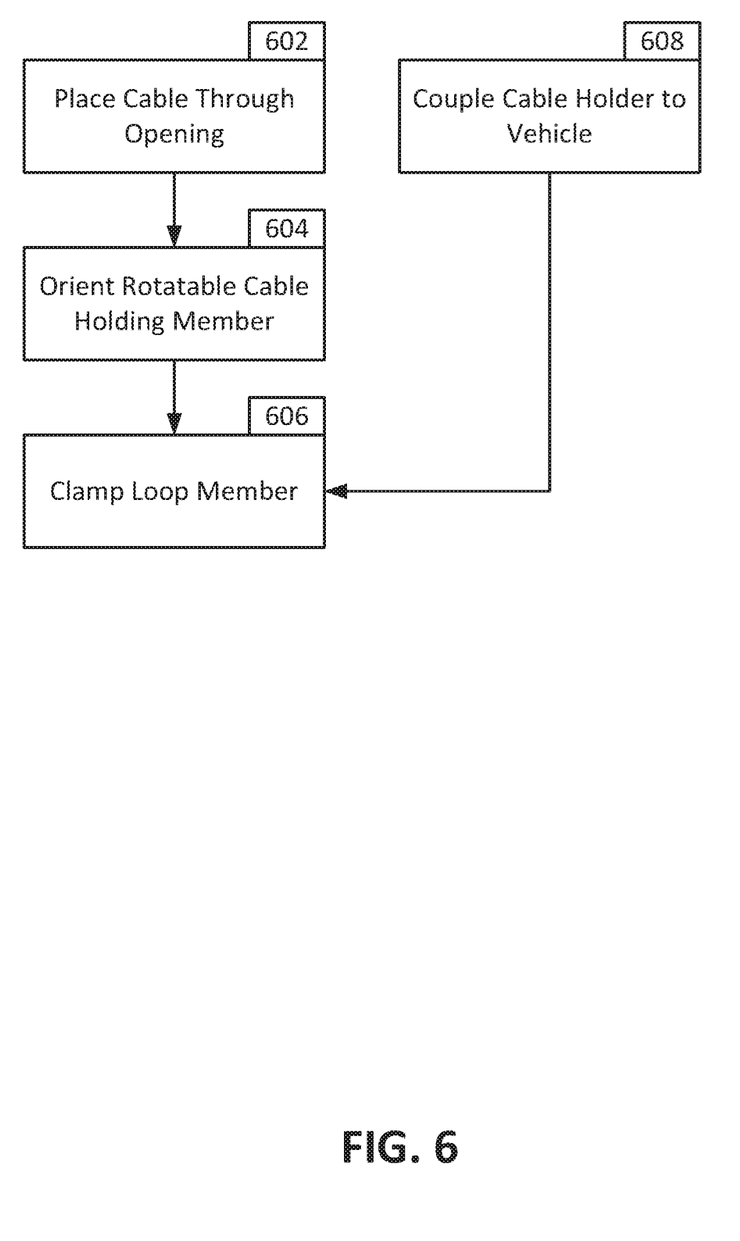
FIG. 6 is a flowchart detailing operation of an orbital cable holder in accordance with an example of the disclosure.

FIG. 6 is a flowchart detailing operation of an orbital cable holder in accordance with an example of the disclosure. In block 602, a cable is inserted through an opening within the rotatable cable holding member. In certain examples, the rotatable cable holding member is a multi-piece cable holding member and the plurality of cable holding member pieces are assembled around the cable. The rotatable cable holding member is oriented in block 604. Orienting the rotatable cable holding member can include rotating the rotatable cable holding member so that stress is minimized on the cable and/or minimizing a rate of curvature of the cable held by the rotatable cable holding member.

Before, after, and/or concurrent with blocks 602 and 604, the cable holder can be coupled to the vehicle. The cable holder can be coupled to the vehicle via, for example, components securing a clamp coupling of the cable holder to the vehicle. After the rotatable cable holding member has been oriented and the cable holder has been coupled to the vehicle, the first loop member arm and the second loop member arm can be clamped together to secure the rotatable cable holding member in the position oriented in block 604.

Examples described above illustrate but do not limit the invention. It should also be understood that numerous modifications and variations are possible in accordance with the principles of the present invention. Accordingly, the scope of the invention is defined only by the following claims.

What is claimed is:

1. An aircraft comprising:
   a cable disposed within the aircraft; and
   a cable holder configured to secure the cable to the aircraft, the cable holder comprising:
      a loop member comprising an interior groove and configured to couple to the aircraft, and
      a rotatable cable holding member disposed within the interior groove, configured to rotate within the interior groove, and comprising an opening configured to receive the cable and allow the cable to pass through.

2. The aircraft of claim 1, wherein the opening is configured to hold the cable so that a vector perpendicular to an inner surface of the opening is substantially perpendicular to an axis of the cable.

3. The aircraft of claim 1, wherein the rotatable cable holding member comprises a plurality of rotatable cable holding member pieces coupled together to form the rotatable cable holding member.

4. The aircraft of claim 1, wherein the loop member comprises a first arm and a second arm hingedly coupled together, wherein the first arm and the second arm are hingedly coupled together on a first side and clamped together on a second side, and wherein the first arm and the second arm are configured to be clamped to hold the rotatable cable holding member in a set position.

5. The aircraft of claim 1, wherein a portion of the cable disposed adjacent to one side of the cable holder is disposed higher than another portion of the cable disposed adjacent to an opposite side of the cable holder.

6. The aircraft of claim 1, wherein the interior groove is substantially spherical and conforms in shape to an outer surface of the rotatable cable holding member.

7. The aircraft of claim 1, wherein the cable holder further comprises a deformable layer disposed between the interior groove and the rotatable cable holding member.

8. The aircraft of claim 1, further comprising a plurality of cable holders, each cable holder coupled to the aircraft, wherein each loop member of the plurality of cable holders comprises a first arm and a second arm hingedly coupled together on a first side and clamped together on a second side, wherein the first arm and the second arm are configured to be clamped to hold the corresponding rotatable cable holding member of the cable holder in a set position, wherein the first arm and the second arm of each of the plurality of cable holders are configured to be clamped together, and wherein each of the first arm and the second arm are separated by a minimum interference distance.

9. The aircraft of claim 1, wherein the rotatable cable holding member comprises a plurality of openings, each opening configured to receive and allow one cable to pass through.

10. The aircraft of claim 1, wherein the opening is configured to substantially conform to an outer circumference of a cross section of the cable.

11. The aircraft of claim 1, further comprising:
    a fuselage; and
    a wing coupled to the fuselage, wherein the cable is disposed within the fuselage and/or the wing.

12. A cable holder configured to secure a cable to a structure, the cable holder comprising:
    a loop member comprising an interior groove and configured to couple to the structure; and
    a rotatable cable holding member disposed within the interior groove, configured to rotate within the interior groove, and comprising a plurality of rotatable cable holding member pieces and an opening configured to receive a cable and allow the cable to pass through.

13. The cable holder of claim 12, wherein the opening is configured to hold the cable so that a vector perpendicular to an inner surface of the opening is substantially perpendicular to an axis of the cable.

14. The cable holder of claim 12, wherein the loop member comprises a first arm and a second arm coupled together to hold the rotatable cable holding member in a set position.

15. The cable holder of claim 12, wherein the interior groove is substantially spherical and conforms in shape to an outer surface of the rotatable cable holding member.

16. The cable holder of claim 12, wherein the cable holder further comprises a deformable layer disposed between the interior groove and the rotatable cable holding member.

17. The cable holder of claim 12, wherein the rotatable cable holding member comprises a plurality of openings, each opening configured to receive and allow one cable to pass through.

18. The cable holder of claim 12, wherein the opening is configured to substantially conform to an outer circumference of a cross section of the cable.

19. A method for securing a cable to a structure, the method comprising:
    assembling a rotatable cable holding member of a cable holder around a cable by disposing the cable within an opening of the rotatable cable holding member;
    orienting the rotatable cable holding member by rotating the rotatable cable holding member relative to a loop member of the cable holder, wherein the loop member comprises an interior groove and the rotatable cable member is disposed within the interior groove; and
    coupling the loop member to a structure.

20. The method of claim 19, further comprising:
    clamping the loop member after orienting the rotatable cable holding member.

* * * * *